United States Patent [19]

Sieracki

[11] Patent Number: 5,067,060
[45] Date of Patent: Nov. 19, 1991

[54] AQUARIUM LAMP

[76] Inventor: Leo C. Sieracki, 1878 Market St., No. 202, San Francisco, Calif. 94102

[21] Appl. No.: 334,098

[22] Filed: Apr. 5, 1989

[51] Int. Cl.⁵ .............................................. F21V 33/00
[52] U.S. Cl. .................................... 362/101; 362/234; 362/253; 362/414; 119/5
[58] Field of Search ............... 362/101, 154, 234, 249, 362/251, 236, 253, 412, 414, 806; 119/5

[56]  References Cited
U.S. PATENT DOCUMENTS

| | | | |
|---|---|---|---|
| 1,762,634 | 6/1930 | Jyumi | 119/5 |
| 2,777,052 | 1/1957 | Combs | 362/101 |
| 4,026,243 | 5/1977 | Jessop, III | 119/5 |

Primary Examiner—Stephen F. Husar
Attorney, Agent, or Firm—Flehr, Hohbach, Test, Albritton & Herbert

[57]  ABSTRACT

An aquarium lamp is disclosed herein which includes a multifunctional column submerged a substantial distance below the water level of the surrounding container. This container is suitable for supporting various life forms and aquatic plants and animals. The column (1) serves as part of the life aquatic support system transporting necessary gases to and from the aquarium container; (2) supports all of the lamp components, including the light sources, lamp shades, electric circuitry, and some of the life support means, such as an air pump and air intake ports; and (3) contains illumination enhancement means for providing internal light to the container, upon activation of a column light source. A colored disc covers the container, providing additional support for the column and additional illumination enhancement.

13 Claims, 4 Drawing Sheets

FIG.—1

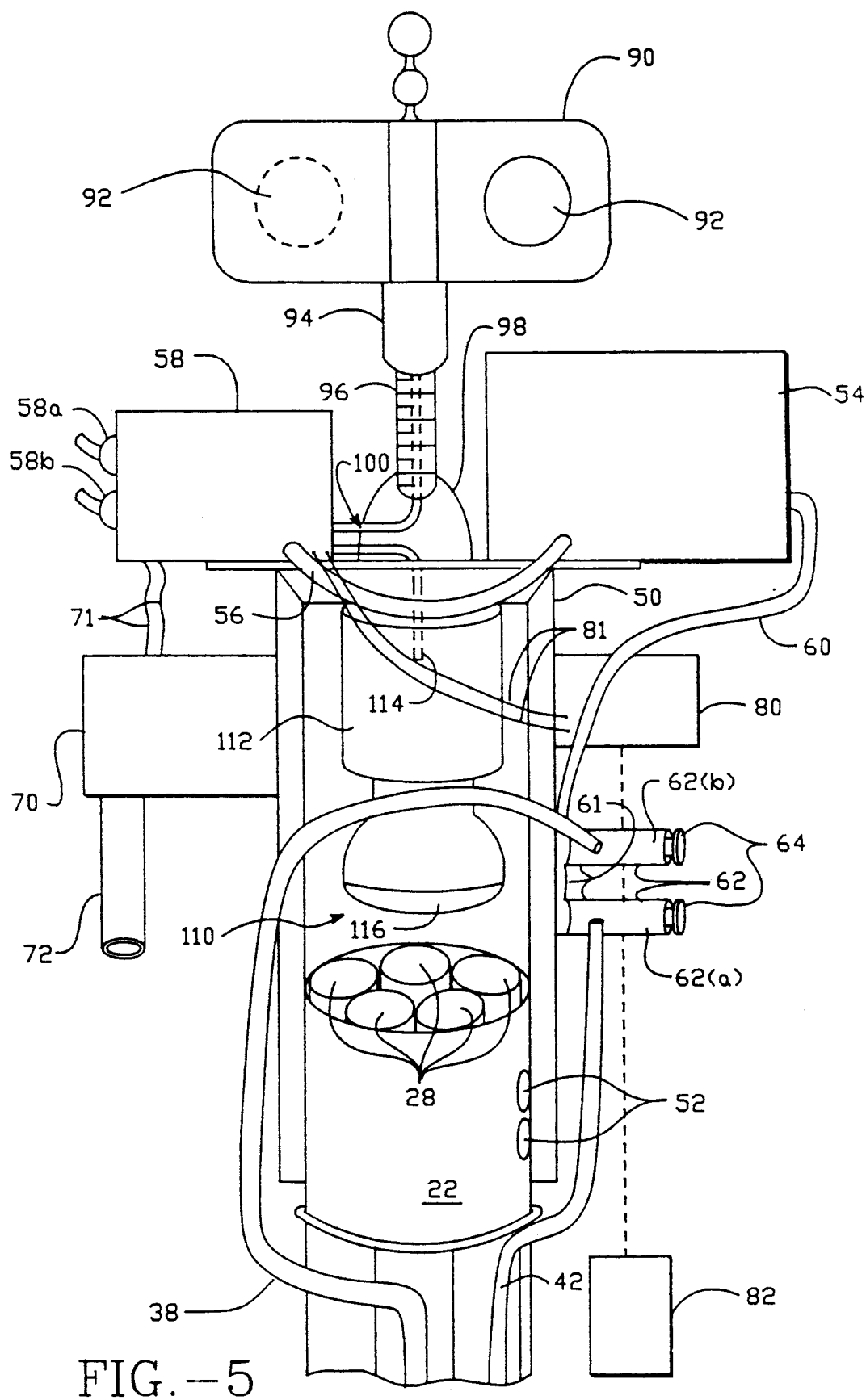
FIG.—5

AQUARIUM LAMP

The present invention relates generally to a lamp with an aquarium at the lamp base, and more particularly to an aquarium lamp wherein the light sources and life support equipment are supported by a multifunctional column.

Aquariums are a popular pastime, maintained by enthusiasts worldwide. An aquarium which supports a lamp and life support equipment hidden from casual visual inspection by way of a multifunctional column, in the manner described herein, is aesthetically pleasing and space saving.

DESCRIPTION OF THE PRIOR ART

Typical prior art aquarium lamps consist of an aquarium in combination with a light source. In these prior art aquariums the light source may be located above the aquarium as in U.S. Pat. No. 2,448,318 (issued to Lowry), U.S. Pat. Nos. 1,789,058 and 1,762,634 (both issued to Jyumi), and U.S. Pat. No. 1,297,254 (issued to Sato). Other prior art aquariums disclose a light source located below the aquarium as in U.S. Pat. No. 2,860,232 (issued to Gray) and U.S. Pat. No. 1,871,742 (issued to Sabath). Moreover, there are prior art aquariums which disclose a light source both above and below the aquarium as in U.S. Pat. No. 1,449,772 (issued to Emma) and U.S. Pat. No. 1,723,272 (issued to Miller).

While these prior art devices disclose aquariums in combination with light sources, they do not disclose any means for incorporating and/or supporting a mechanical life support system for the aquatic life, such as mechanically forced air. Life support equipment is necessary to support the majority of aquatic life, and will allow the present invention to support a wide variety of aquatic life which could not otherwise be sustained in the prior art aquarium lamps. For example, in U.S. Pat. No. 1,762,634 (issued to Jyumi) there are holes present in the cover of the aquarium such that the heat from the light source will cause, by way of convection, air to circulate in proximity with the top of the water maintained within the aquarium. Yet such an aquarium only provides a limited amount of aeration and an insufficient amount to support most aquatic life.

Moreover, there is no disclosure in the prior art of a multifunctional column which both supports a light source and the life support equipment. For example, in U.S. Pat. No. 1,297,254 (issued to Sato) the aquarium disclosed may include a center glass column as part of the actual aquarium base whereby electrical wires which supply power to the light source may be located. Yet Sato does not disclose column support for life support equipment or even include a multifunctional column of the type disclosed in the present invention which is a separate piece of equipment from the aquarium base such that it can be removed for easy cleaning and carry the gases necessary to maintain aquatic life.

Thus there are two common distinctions between the present invention and the prior art discussed above.

First, these prior art aquarium lamps are inadequate to support many forms of aquatic life since there is neither the teaching or means for incorporating mechanical life support equipment. In addition, there is no teaching of the use of mechanical life support means which are hidden from casual view.

Second, the present invention does not require a separate housing for the life support system. Rather it is supported by a column whereby it is hidden from casual view due to the shade on the lamp portion of the present invention.

SUMMARY OF THE INVENTION

Accordingly, it is an object of the invention to provide an aquarium lamp with a life support system supported by a column extending up through the aquarium sufficient to support sophisticated forms of aquatic plants and animals or terrestrials.

Another object of the invention is to provide an aquarium lamp with a multifunctional column, extending a substantial distance into the aquarium, capable of (1) transporting necessary gases to and from the aquarium container; (2) supporting all light sources, lamp shades, and other life support means, such as an air pump, filtration means and an electric circuit box; and (3) containing variously colored illuminating enhancement means for radiating colored light to both the aquarium and surrounding area.

A further object of the invention is to provide separate light sources for illuminating the aquarium and for room lighting.

A further object of the invention is to provide an aquarium lamp wherein the light sources and life support means are hidden from casual view.

In accordance with an actual working embodiment of the present invention, the aquarium lamp consists of an aquarium and a light source interactively connected by a multifunctional column, comprised of at least one tube. The column rests on the core of the filter which is located on the base of the aquarium and supports the aquatic life support system and lighting means (including a shade). The life support equipment may include items such as an air pump, electric circuit box, filter (either mechanical or air operated), automatic feeder and heater. The column by way of hollow tubes allows for the transportation of pressurized air or pressurized water to the aquarium. The column also supports two light sources, one primarily for illuminating the aquarium, and the other being an incandescent room light source, all surrounded by a lamp shade. The above mentioned items, supported by the column, are carried above the aquarium water line. The aquarium light source cooperates with illumination enhancing rods, encased within columnar support tubes, providing internal lighting of the aquarium.

Moreover, a disc covers the aquarium and functions similarly to the illumination enhancement rods, in that it provides color to the aquarium as well as the surrounding area. The disc contains at least one opening. The first opening has a diameter slightly larger than the column and it frictionally engages and provides additional support to the column. The second opening serves as an ambient air intake port for the aquarium and to allow access to feed the aquatic life either manually or by an automatic feeder.

BRIEF DESCRIPTION OF THE DRAWINGS

The aquarium lamp disclosed herein, and particularly its arrangement of columnar tubes, will be discussed in detail with the drawings wherein:

FIG. 5 is a side view of the lighting and life support means which are located at the top of the column and within the lamp shade.

DETAILED DESCRIPTION OF A PREFERRED EMBODIMENT

Figure 1:
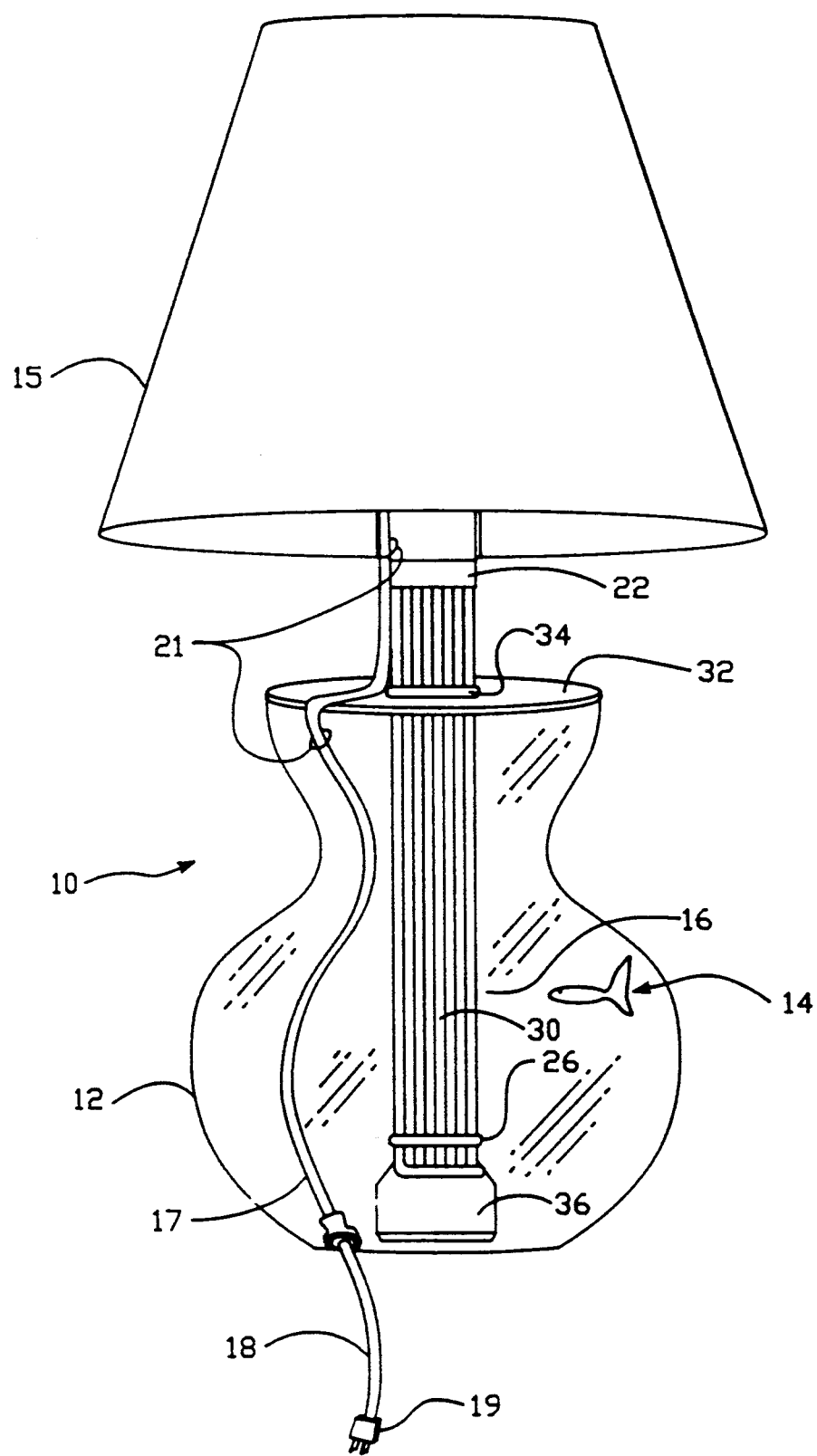
FIG. 1 is a side view of the aquarium lamp.

Turning now to the drawings, wherein like components are designated by like reference numerals throughout the various figures, attention is first directed to FIG. 1. The aquarium lamp 10 is comprised primarily of an aquarium 12, suitable for containing the water necessary to support aquatic life 14, a lamp shade 15 which is supported above the aquarium by column 16 which extends down through aquarium 12 and rests on top of the filter core which is located at the bottom of aquarium 12.

In addition a cover 32 may be placed on the top of aquarium 12 with an opening such that column 16 may extend therethrough (and be maintained in position by a column support gasket 24). Cover 32 may also be of a particular translucent material and of varying colors such that light source 110 may dissipate light the color of the cover 32 through aquarium 12.

Aquarium 12 is preferably transparent or translucent such that observers may view the aquatic or terrestrial life 14 within. Moreover, aquarium 12 may be of any aesthetic shape consistent with the above principles of supporting aquatic or land life and of any material, such as glass or a plastic composite that will allow for observers to see the aquatic life enclosed therein.

Column 16 is multi-functional in that in addition to supporting the lighting means (shown in FIG. 5) contained within shade 15 it also acts as the support and conduit for the life support system necessary to maintain the aquatic life 14.

Electricity is delivered to both the life support means and lighting means by way of an electrical cord 18 which contains a standard wall plug 19 at one end and an electrical circuit box 58 (hidden from view by shade 13 but shown in FIG. 5) wherein it is distributed. Power cord 18 is enclosed in a rigid or flexible tube 17 which is formed to fit against aquarium 12 and is attached at points 21 by means such as "Velcro". In a preferred embodiment the aquarium 12 may have a u-shaped channel so that cord 18 may be placed within the channel.

Figure 2:
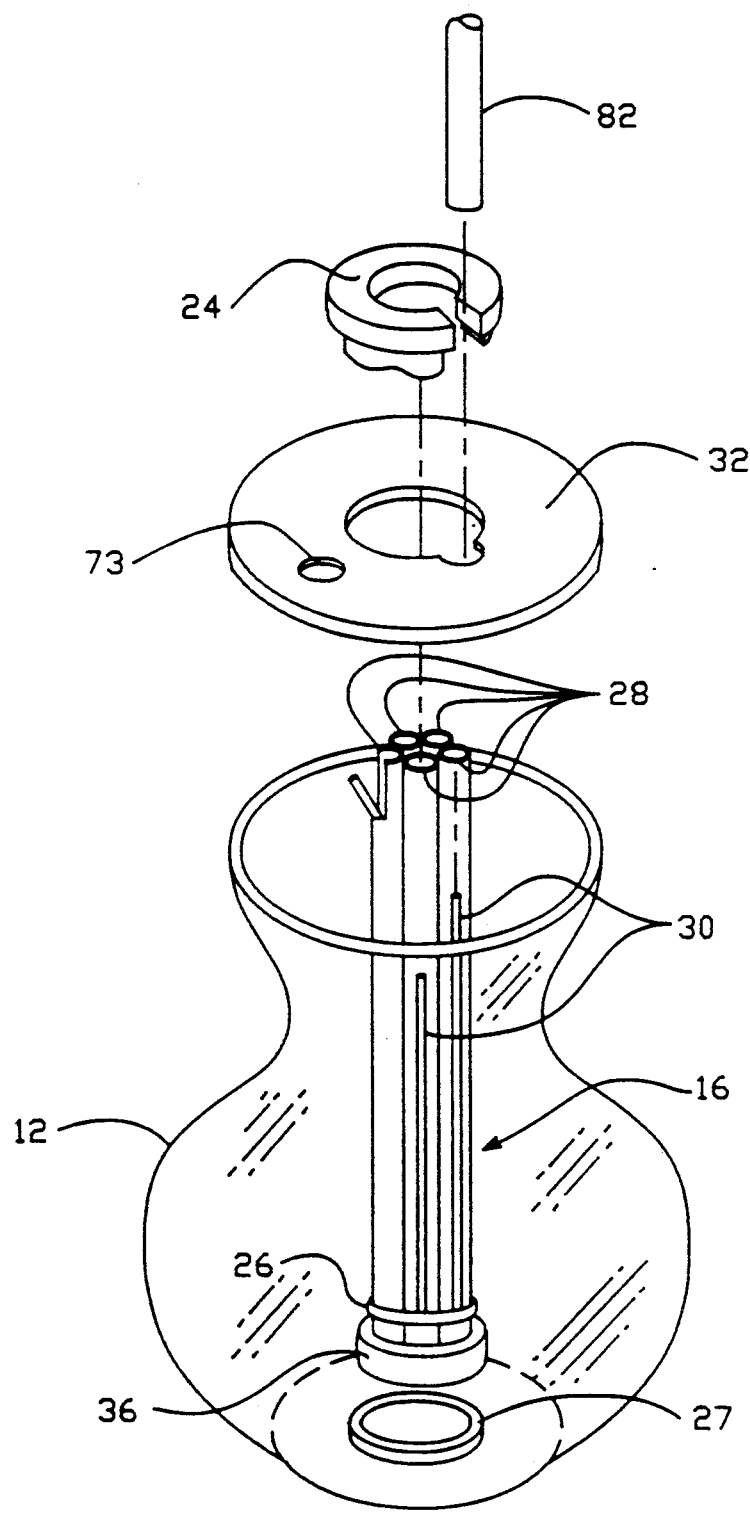
FIG. 2 is an exploded view of the aquarium lamp shown in FIG. 1 (minus the shade).

FIG. 2 shows column 16 preferably comprised of a plurality of hollow clear tubes 28 bound together by a gasket 24, a rubber band 26, a filter ring 27 and a metallic sleeve 22 (shown in FIG. 1). One reason for having a multitude of hollow clear tubes 28 is that they may contain colored acrylic or glass rods 30 such that if a light source 116 (shown in FIG. 5) is directed down through column 16, light will be dissipated in the colors of rods 28 through the aquarium 12. Moreover, a plurality of rods 28 gives added support to the lighting and life support means.

By combining the colors of the cover 32 and rods 30 the user is able to adjust the ambient light or mood of the light to the particular surroundings of a room, the color scheme already present in a room, and provide nice soft lighting to the surrounding area.

Column 16 rests upon a filter 36 which in turn rests upon the bottom of aquarium 12 within ring 27. Such a filter is manufactured by Jungle Labs of Texas.

Figure 3:
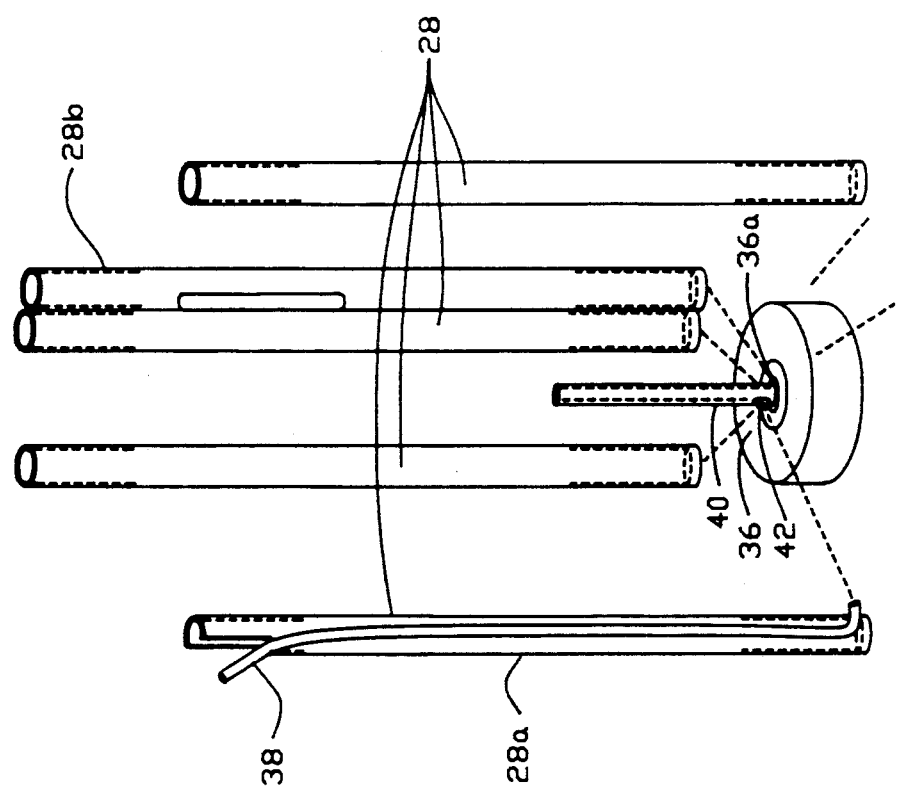
FIG. 3 is an exploded view of the column, shown in FIG. 1 and FIG. 2.

FIG. 3 is a exploded view of column 16 wherein five acrylic tubes 28 are shown. These acrylic tubes all rest upon the center of the filter 36 which is designated 36a. Tube 28a includes within it an air conduit tube 38 which connects with mechanical air pumping means 54 (shown in FIG. 5) wherein air is mechanically forced down through conduit tube 38 and into a short centrally located tube 40 by way of connection 42. Air is mechanically forced through connection 42 wherein it naturally rises through column 40, thereby creating a suction effect in filter 36 such that marine bile and debris may be sucked into filter 36. This assists the operation of filter 36 in an effort to keep the aquarium 12 clean. It should be noted that tube 40 is sized to connect with a center hole 36a of filter 36 such that the suctioning effect of air traveling up through tube 40 will pull materials suspended within the water located in aquarium 12 into filter 36. The water pulled into filter 36 is drawn through horizontal slots located in center ring 36a though which the water is drawn up tube 40 by the air and this water is released back into aquarium 12 by way of a slot located near or at the water line in column 28b. Ideally, tubes 28 are held sufficiently close together that they form a seal so that the only escape back into aquarium 12 for water pulled into filter 36 and drawn through tube 40 is drawn through the slot in tube 28b.

Figure 4:
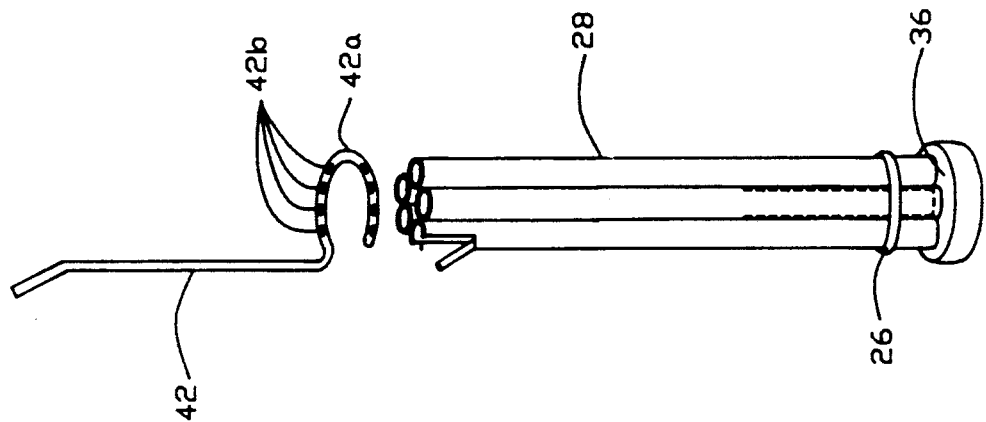
FIG. 4 is a side view of the column with one air line removed.

Moving to FIG. 4, tubes 28 are shown secured by rubber band 26 and resting upon filter 36. An additional bubble ring air tube 42 (shown removed from tubes 28 for clarity) runs down along the outside of tubes 28 wherein it reaches a bottom portion 42a which is circular about column 16 and filter 36 and includes a multitude of holes 42b such that air pumped down through air tube 42 will be released and bubble up around center column 16. While this additional air pump system is not required for activation of the filtration system (including filter 36), it does provide additional air for support of the aquatic life and is an aesthetically pleasing way to emphasize the column 16 and to diffuse the light radiating from column 16.

FIG. 5 is a close-up of the top of column 16 with shade 15 removed. Attention is directed to a sleeve 22 which holds the plurality of tubes 28 in place. Sleeve 22 is metallic or of an other sufficiently strong material such that it can support a U-shaped bar 50 by way of fastening means such as rivets 52. Both the lighting means and life support means are attached to bar 50.

Specifically in the preferred embodiment life support means include an air pump 54 which is electrically or battery, e.g., 12 Volt for either a yacht or recreational vehicle driven by wire 56 which is connected to electrical circuit box 58. The air output 60 of air pump 54 is connected to an air valve 61 wherein the air flow is separated and directed through two separate air ports 62a and 62b, both of which are governed by regulatory valves 64. Air port 62a provides air by way of 38 down through the length of column 16 such that the air is transported through connection 42 and up through tube 40 (see FIG. 3).

Air port 62b transports air by way of tube 42 which runs down along tube 28 of column 16. As discussed, the end of plastic tube 42 is a circular ring 42a (best shown in FIG. 4) and which contains a plurality of holes 42b surrounding the column 16 such that air may be regulated and allowed to bubble up around column 16.

These two manners of mechanically forcing air into the aquarium do so in a way which is both aesthetically pleasing and functional at the same time. By forcing the air to the bottom of aquarium 12 where it is released, the air bubbles up through aquarium 12, allowing for sufficient transfer of gases necessary to support the aquatic life 14.

In addition to air pump 54 there may be included an automatic feeder 70 which is attached to bar 50 by fastening means. Such an air pump is made by Tetra of West Germany. The feeder 70 is attached to electric circuit box 58 by an electrical cord 71 or it may be battery operated such that connection to electrical outlet box 58 is not necessary. In either event the feeder may include a downspout 72 which corresponds to an opening 73 in cover 32 such that food may be regularly dispensed at predetermined intervals into the aquarium without the necessity of manual feeding. Such a feeder is manufactured by Eheim of West Germany.

Next a heater 80 may also be included and is frictionally engaged between column 16 and cover 32 and connected to electrical outlet box 58 by wire 81. The heater 80 may interact with the water and contained in aquarium 12 by way of a heating element 82 which is externally connected to column 16 in a manner in which it is either hidden from casual view or aesthetically viewed as part of column 16.

As to the lighting means supported by bar 50, attention is directed to fixture 90 which light sockets 92 facing in opposite directions capable of handling two standard incandescent bulbs of varying wattages. Fixture 90 is connected to bar 50 by way of coupling means 94 attended by machine threads 96 so that fixture 90 may be raised or lowered depending on the size, shape and style of shade 15. As to the actual connection of threaded portion 96 to brace 50, a U-shaped piece of metal 98 is employed such that sufficient room is left for electrical power to be provided to the second lighting means 110. The electrical means for outlet 90 is run down through threaded portion 96 whereby it is connected by electrical wire 100 to electrical circuit box 58.

A second light source 110 is included for spotlight type illumination down through tubes 28 of column 16. Specifically a ceramic base 112 is connected by an electrical wire 114 through a hole in bar 50. Ceramic base 112 will accept a small spotlight 116 so that the light emanating from spotlight 116 will be directed down through tubes 28 of column 16. In addition the light from spotlight 116 will be directed to the colored acrylic or glass rods 28 contained within tubes 28 such that the color of rods 30 will emanate through aquarium 12. Moreover spotlight 116 will allow for a certain amount of light to be directed to cover 32 which also may be of a specific color to add to the mood or ambience of the present invention.

The means for operating the two light sources 90 and 110 are included in electrical box 58 which has two separate switches 58a and 58b or touch a sensor switch around shade 15 allowing for each of the light sources to be operated independently.

From the foregoing description, it is clear that those skilled in the art could make changes in the described embodiment of the invention without departing from the broad inventive concepts thereof. It is understood, therefore, that this invention is not limited to the particular embodiment disclosed, but is intended to cover any modifications which are within the spirit and scope of the claims.

What is claimed is:
1. A lamp comprising:
an aquarium;
light source means mounted to and located above the aquarium;
aquatic life support means including an air pump for mechanically forcing the necessary gases sufficient to support aquatic life into said aquarium; and
load support means extending from a top of said aquarium down into said aquarium and including a conduit communicating said gases into said aquarium, said load support means supporting said light source means and a portion of said aquatic life support means above said aquarium.

2. The lamp of claim 1 wherein said life support means includes heating means, and
said load support means includes a conduit communicating said heating means into said aquarium.

3. The lamp of claim 1 wherein said life support means includes filtration means, and
said load support means includes a conduit communicating said filtration means into said aquarium.

4. The lamp of claim 3 wherein, said load support means includes a column extending from a top of said aquarium down into said aquarium to a position proximate a bottom of said aquarium, and said filtration means includes a filter located at the bottom of said column.

5. The lamp of claim 1 wherein said light source means includes an incandescent light bulb fixture.

6. The lamp of claim 1 wherein, said load support means is light transmissive, and said light source means includes a spotlight type light means directed down through said load support means.

7. The lamp of claim 1 wherein, said load support means is light transmissive, and said light source means includes both an incandescent light source transmitting light radially of said lamp and a spotlight directed down through said load support means.

8. The lamp of claim 1 wherein said load support means includes a column consisting of at least one tube.

9. The lamp of claim 1 wherein said load support means includes a column comprised of a plurality of tubes.

10. The load support means of claim 9 wherein at least one tube in said column carries mechanically forced air into said aquarium.

11. The lamp of claim 9 wherein said column includes a colored rod inserted for the transmission of light from said light source through said rod.

12. The lamp of claim 1 wherein said life support means and said light source means are not casually visually apparent.

13. A lamp comprising: a container for water; a column, which includes air tubes and illumination enhancing rods, said column mounted to said container and extending a substantial distance into said container; an air pump in communication with said column, said air pump being carried by said column at a point above a container water line; a filter in communication with said column, said filter being carried by said column at a column end below the container water line, a first light source carried by said column above the container water line, said first light source communicating with said illumination enhancing rods for transmission of light into said container; a second light source carried by said column above the container water line and above said first light source for illuminating the desired area; an electric circuit box carried by said column above the container water line and above said first light source for controlling said first and second light sources and said air pump; and a heater and feeder carried by said column above the container water line.

* * * * *